United States Patent [19]

Sakakiyama et al.

[11] Patent Number: 4,680,712
[45] Date of Patent: Jul. 14, 1987

[54] SYSTEM FOR CONTROLLING AN ELECTROMAGNETIC CLUTCH FOR A VEHICLE

[75] Inventors: Ryuzo Sakakiyama, Tokyo; Toshio Takano, Hamura, both of Japan

[73] Assignee: Fuji Jukogyo Kabushiki Kaisha, Tokyo, Japan

[21] Appl. No.: 695,978

[22] Filed: Jan. 29, 1985

[30] Foreign Application Priority Data

Jan. 31, 1984 [JP] Japan ................................. 59-15421

[51] Int. Cl.⁴ ...................... B60K 41/22; F16D 27/16
[52] U.S. Cl. .............. 364/424.1; 192/0.032; 192/0.052; 192/0.076
[58] Field of Search ................. 364/424.1; 192/0.032, 192/33, 52, 0.75, 0.76, 3.56, 3.58

[56] References Cited

U.S. PATENT DOCUMENTS

| | | | |
|---|---|---|---|
| 4,401,199 | 8/1983 | Takano et al. | 192/0.052 |
| 4,461,374 | 7/1984 | Umezawa | 192/0.052 X |
| 4,473,143 | 9/1984 | Windsor | 192/0.052 |
| 4,484,672 | 11/1984 | Takano et al. | 192/3.56 |
| 4,494,639 | 1/1985 | Takano et al. | 192/0.052 |

Primary Examiner—Felix D. Gruber
Attorney, Agent, or Firm—Martin A. Farber

[57] ABSTRACT

A system for controlling an electromagnetic clutch for an infinitely variable belt-drive transmission, which is provided with an accelerator pedal switch for producing an output signal at release of an accelerator pedal of a vehicle, and a vehicle speed detector for producing an output signal at a low vehicle speed. The system is arranged to produce a small drag current signal in dependency on the accelerator pedal release signal and the low vehicle speed signal, so that a small drag clutch current flows in a coil of the electromagnetic clutch.

4 Claims, 9 Drawing Figures

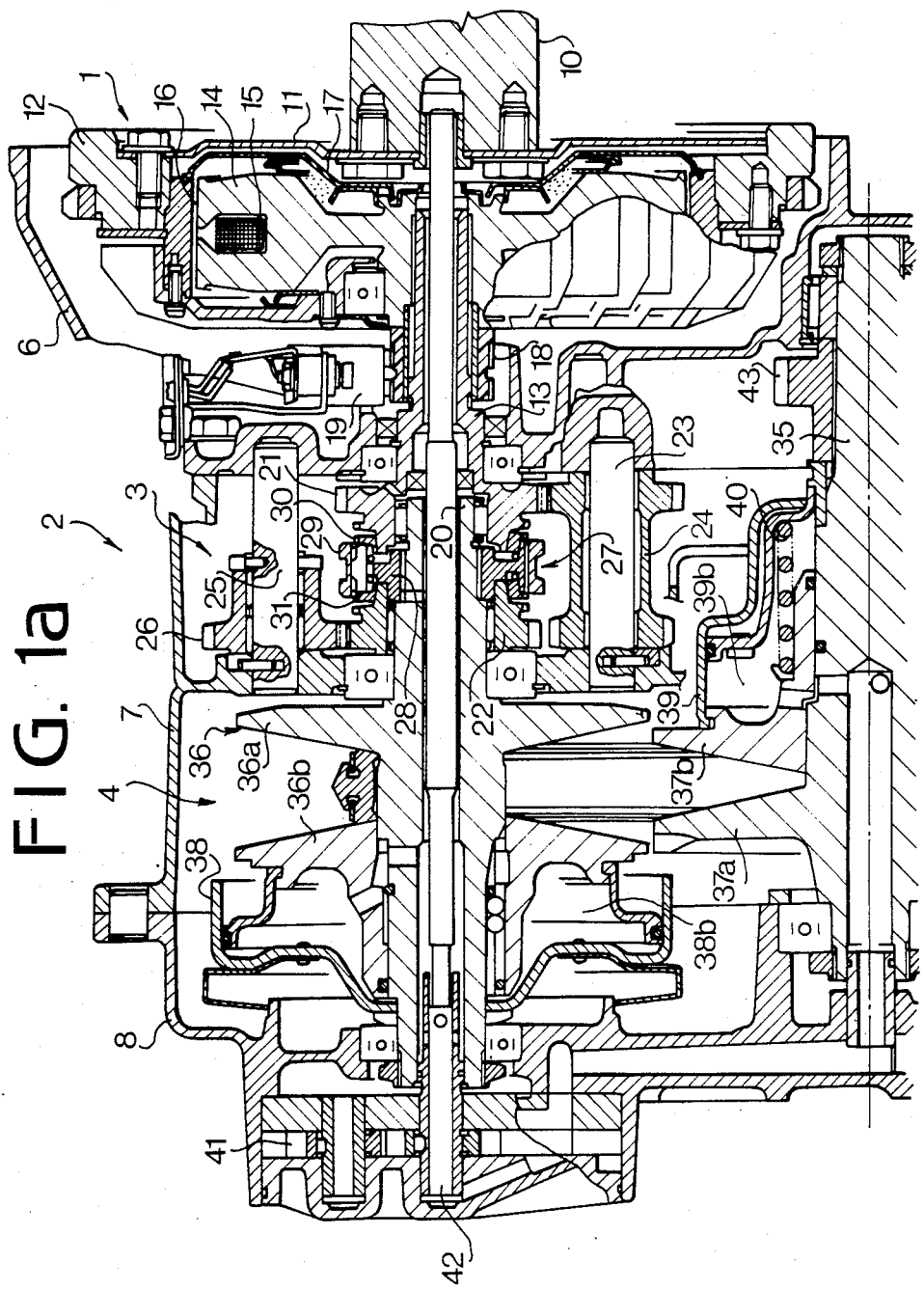

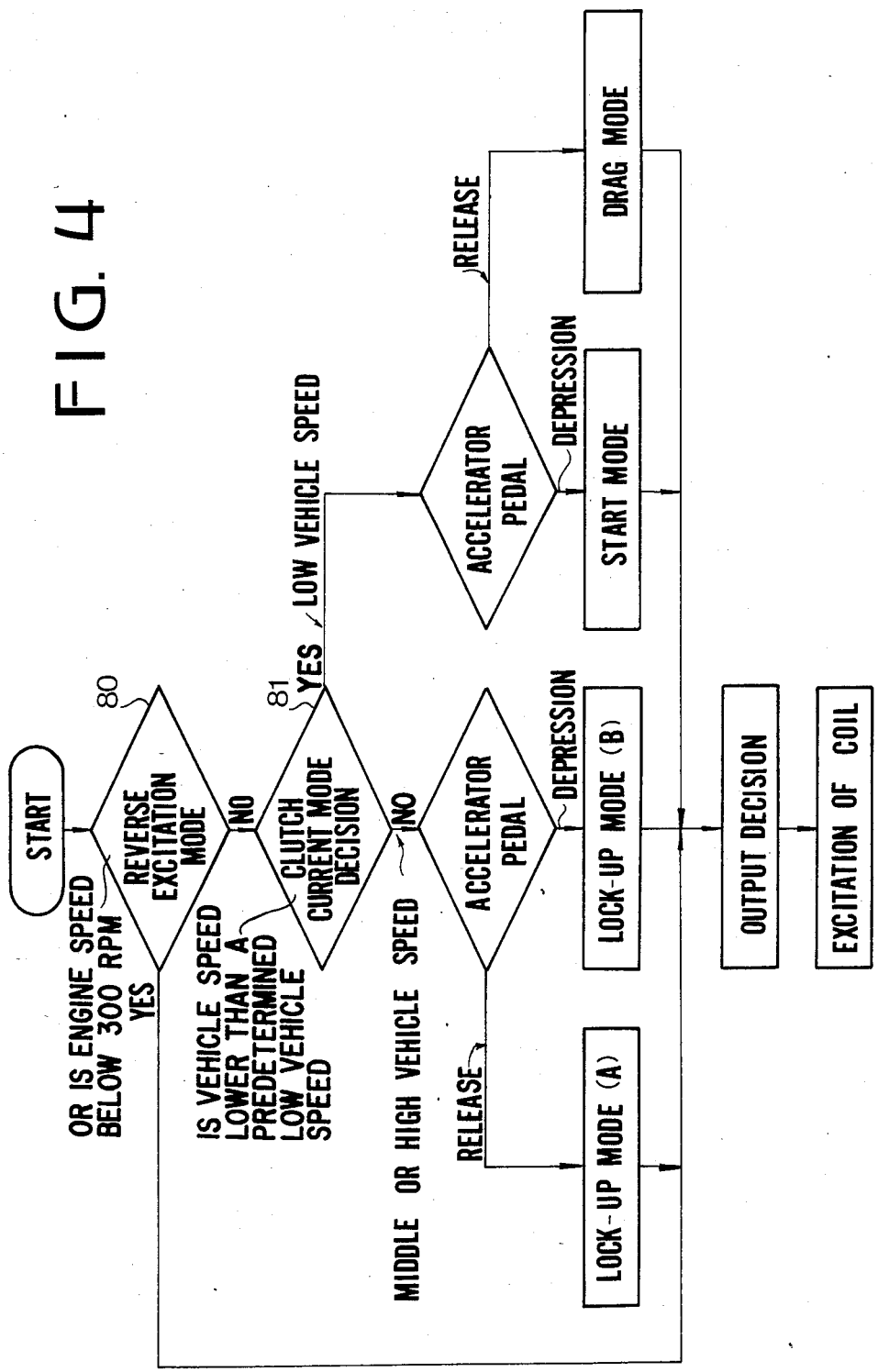

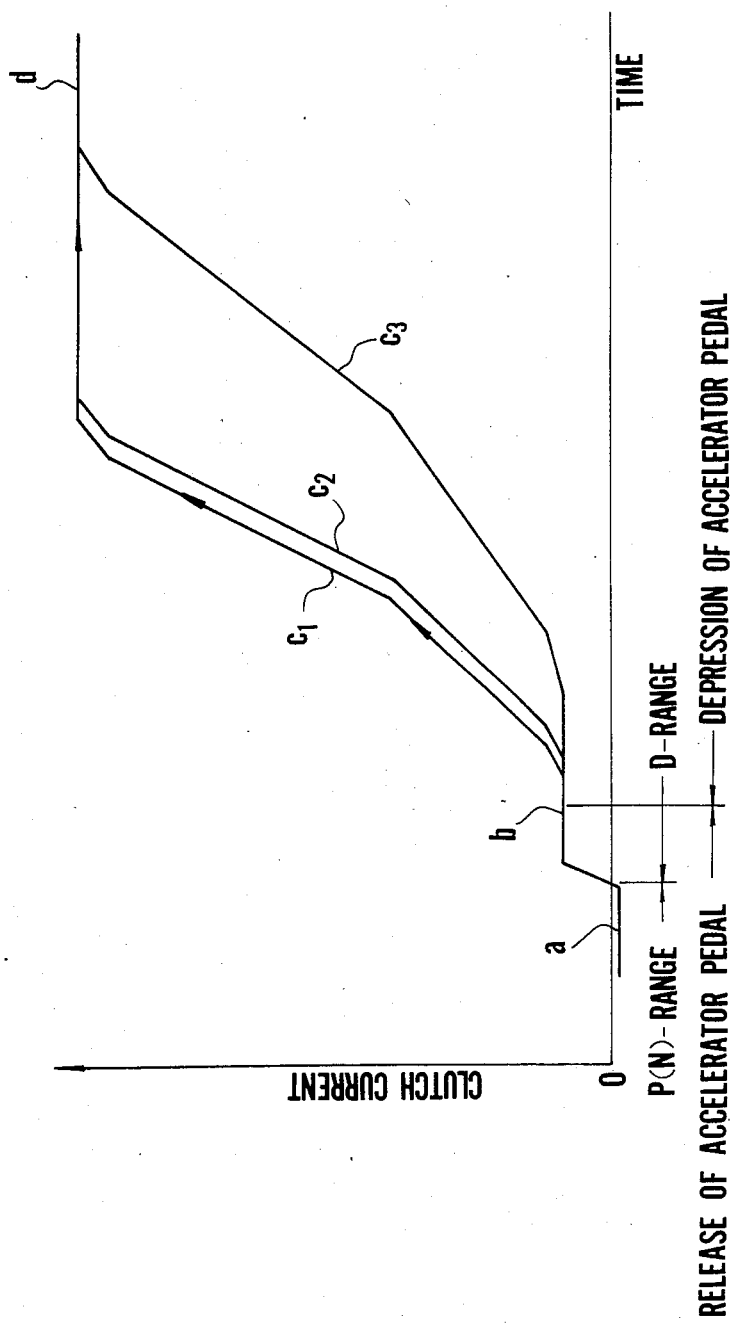

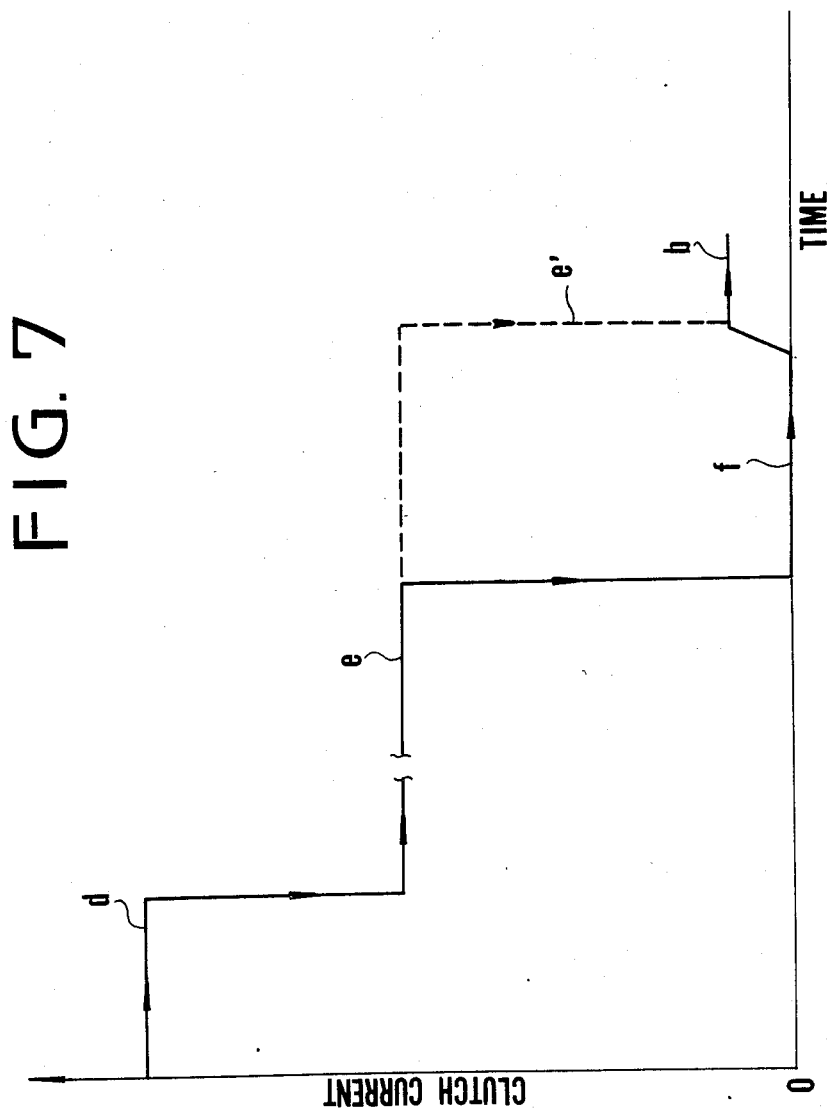

SYSTEM FOR CONTROLLING AN ELECTROMAGNETIC CLUTCH FOR A VEHICLE

BACKGROUND OF THE INVENTION

The present invention relates to a system for controlling an electromagnetic clutch for an infinitely variable belt-drive transmission.

An automobile provided with an infinitely variable belt-drive transmission with an electromagnetic clutch is known. The infinitely variable belt-drive transmission is controlled by a control system to provide various operational ranges such as a drive range (D-range), high engine speed drive range (Ds-range), reverse range (R-range), neutral range (N-range), and parking range (P-range). When the Ds range is selected during the drive range driving, the transmission ratio of the transmission is raised, so that engine braking effect is brought about. On the other hand, in the infinitely variable belt-drive transmission, the static friction torque in the belt and pulley device at starting of the automobile is large. Accordingly, it is necessary to deal with the problem of the large static friction torque. Further, inconsistent requirements such as increasing the clutch torque at the engagement of the clutch and improvement of electric power consumption should be fulfilled.

SUMMARY OF THE INVENTION

The object of the present invention is to provide a control system which can control the clutch torque (clutch current) of an electromagnetic clutch in accordance with driving conditions of a vehicle so as to provide preferable driving characteristics.

In the system of the present invention, reverse excitation mode, starting mode, drag mode and two-lock-up engage modes are provided. The system of the present invention decides which mode should be used for controlling clutch current in accordance with driving conditions of a vehicle.

According to the present invention, there is provided a system for controlling an electromagnetic clutch for a motor vehicle having an infinitely variable belt-drive transmission which has a drive range, a reverse range and a neutral range, and a selector lever for selecting the ranges. The system comprises vehicle speed detecting means for producing a vehicle speed signal, first switch means for detecting the position of the selector lever and for producing output signals, and second switch means for producing an output signal dependent on the depression of an accelerator pedal of the vehicle.

The system further comprises means for producing a small drag current signal dependent on the signal at low vehicle speed and on the signal from the second switch means at the release of the accelerator pedal, means for producing a lock-up engage current signal dependent on the signal at middle or high vehicle speed, and output decision means applied with each of the current signals for controlling the current passing through a coil in the electromagnetic clutch in dependency the applied current signal.

In an aspect of the present invention, the system further comprises engine speed detecting means for producing an output signal dependent on engine speed, and the lock-up engage current signal comprises two kinds of signals, one of which provides a low lock-up engage current at the release of the accelerator pedal, and the other provides a high lock-up engage current at the depression of the accelerator pedal.

The other objects and features of this invention will become apparently understood from the following description with reference to the accompanying drawings.

BRIEF DESCRIPTION OF DRAWINGS

FIGS. 1a and 1b are sectional views of an infinitely variable belt-drive transmission to which the present invention is applied;

FIG. 4 is a flow chart showing the operation of the control system;

FIGS. 6 and 7 are graphs showing variation of clutch current.

DETAILED DESCRIPTION OF THE PREFERRED EMBODIMENT

Figure 1B:
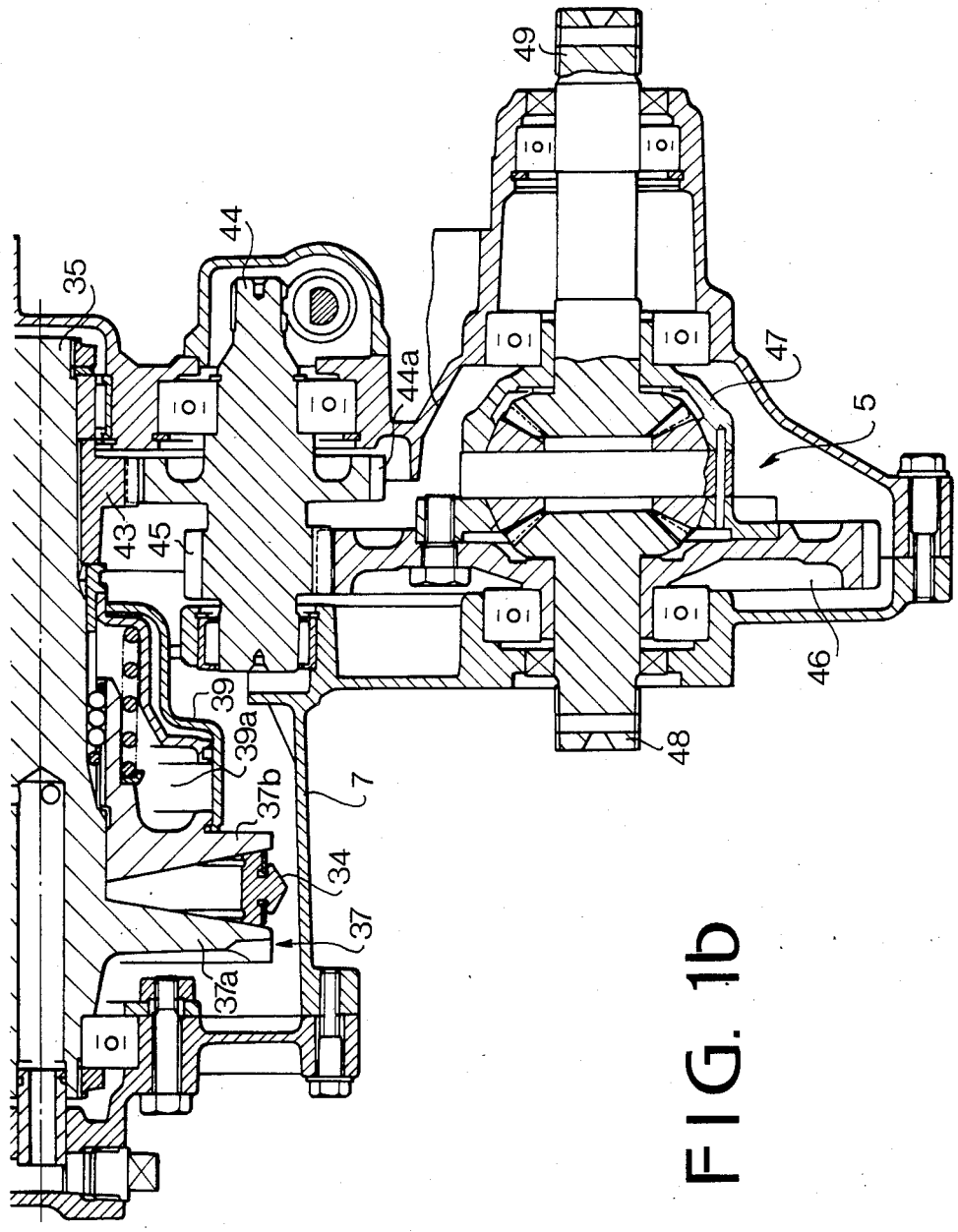

Referring to FIGS. 1a and 1b, an infinitely variable belt-drive automatic transmission for a vehicle, to which the present invention is applied, comprises an electromagnetic powder clutch 1, an infinitely variable belt-drive transmission 2, a selector device 3, pulleys and belt device 4, final reduction device 5, and a pressure oil control circuit (not shown). The electromagnetic powder clutch 1 is provided in a housing 6. The selector device 3, pulleys and belt device 4, and final reduction device 5 are provided in a main housing 7 and a side housing 8. A crankshaft 10 of an engine (not shown) is connected to an annular drive member 12 through a drive plate 11 of the electromagnetic powder clutch 1. The electromagnetic powder clutch comprises a driven member 14, and a magnetizing coil 15 provided in the driven member 14. The driven member 14 has its outer periphery spaced from the inner periphery of the drive member 12 by a gap 16, and a powder chamber 17 is defined between the drive member 12 and driven member 14. magnetic powder is provided in the powder chamber 17. The driven member 14 is secured to an input shaft 13 of the belt-drive transmission. A holder secured to the driven member 14 carries slip rings 18 which are electrically connected to the coil 15. The coil 15 is supplied through brushes 19 and the slip rings 18 with current from a control circuit for the electromagnetic powder clutch.

When the magnetizing coil 15 is excited by the clutch current, the driven member 14 is magnetized to produce a magnetic flux passing through the drive member 12. The magnetic powder is aggregated in the gap 16 by the magnetic flux and the driven member 14 is engaged with the drive member 12 by the powder. On the other hand, when the clutch current is cut off, the drive and driven members 12 and 14 are disengaged from one another.

In the belt-drive transmission 2, the selector device 3 is provided between the input shaft 13 and a main shaft 20. The main shaft 20 is cylindrical and is disposed coaxially with the input shaft 13. The selector device 3 comprises a drive gear 21 integral with the input shaft 13, a reverse driven gear 22 rotatably mounted on the main shaft 20, and a synchronizer 27 mounted on the main shaft 20. The drive gear 21 meshes with one gear of counter gears 24 rotatably mounted on a shaft 23.

Another gear of the counter gears 24 engages with an idler gear 26 rotatably mounted on a shaft 25, which in turn engages with the driven gear 22.

The synchronizer 27 comprises a hub 28 secured to the main shaft 20, a synchronizer sleeve 29 slidably engaged with the hub 28 with splines, and synchronizer rings 30 and 31. The synchronizer sleeve 29 is adapted to engage with splines of the drive gear 21 or with splines of driven gear 22 through rings 30 or 31.

At a neutral position (N-range) or a parking position (P-range) of a selector lever 50 (FIG. 2), the sleeve 29 does not engage either gear, so that the main shaft 20 is disconnected from the input shaft 13. When the sleeve 29 is engaged with the gear 21, the input shaft 13 is connected to the main shaft 20 through the gear 21 and synchronizer 27 to provide a drive range (D-range) or a high engine speed drive range (Ds-range).

When the sleeve 29 is engaged with the gear 22, the input shaft 13 is connected to the main shaft 20 through the gears 21, 24, 26 and 22 to provide a reverse driving position (R-range).

The main shaft 20 has an axial passage in which there is mounted an oil pump driving shaft 42 connected to crankshaft 10 is mounted. An output shaft 35 is provided in parallel with the main shaft 20. A drive pulley 36 and a driven pulley 37 are mounted on the shafts 20 and 35. A fixed conical disc 36a of the drive pulley 36 is integral with the main shaft 20 and an axially movable conical disc 36b is axially slidably mounted on the main shaft 20. The movable conical disc 36b also slides in a cylinder secured to the main shaft 20 to form a servo device 38. A chamber of the servo device 38 communicates with an oil pump 41 through the pressure oil control circuit. The oil pump 41 is driven by the shaft 42.

A fixed conical disc 37a of the driven pulley 37 is formed on the output shaft 35 opposite the movable disc 36b and a movable conical disc 37b is slidably mounted on the shaft 35 opposite disc 36a. The movable conical disc 37b has a cylindrical portion in which a piston portion of the output shaft 35 is slidably engaged to form a servo device 39. A chamber of the servo device 39 is communicated with the oil pump 41 through the pressure oil control circuit. A spring 40 is provided to urge the movable conical disc 37b toward the fixed conical disc 37a. A drive belt 34 engages with the drive pulley 36 and the driven pulley 37.

Secured to the output shaft 35 is a drive gear 43 which engages with an intermediate reduction gear 44a on an intermediate shaft 44. An intermediate gear 45 on the shaft 44 engages with a final gear 46. Rotation of the final gear 46 is transmitted to axles 48 and 49 of driving wheels of the vehicle through a differential 47.

The pressure oil control circuit is responsive to vehicle speed, engine speed and throttle valve position for controlling the oil from the oil pump 41 to the servo devices 38 and 39 thereby to move the discs 36b and 37b. Thus, transmission ratio is infinitely changed. When the Ds range is selected, the transmission ratio is increased by the operation of the pressure oil control circuit.

Figure 2:
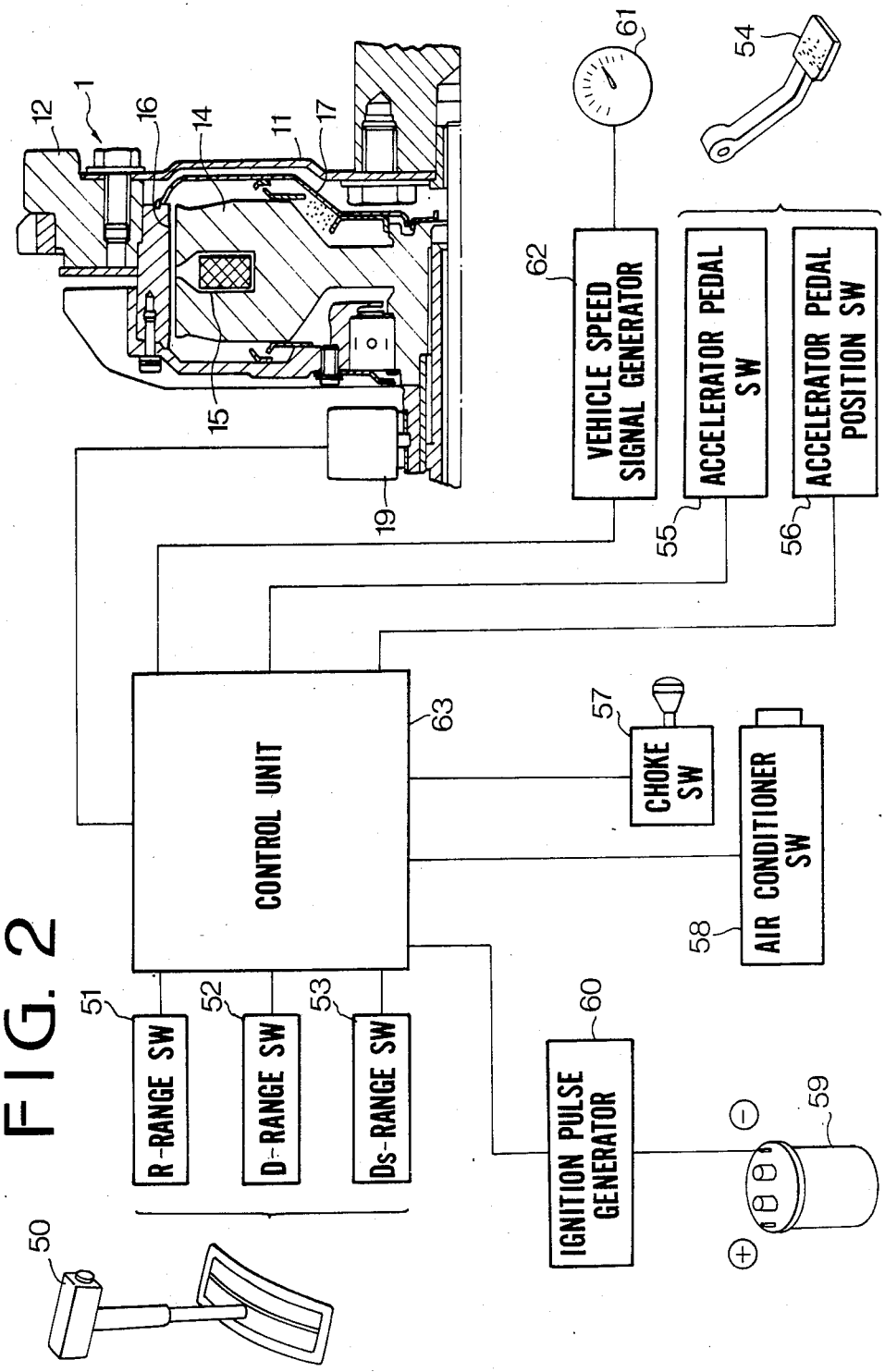
FIG. 2 is a schematic diagram showing a control system according to the present invention.

Referring to FIG. 2 showing a control system according to the present invention, an R-range switch 51, a D-range switch 52, and a Ds-range switch 53 are provided to produce high level output signals at respective positions of the selector lever 50. An accelerator pedal switch 55 is provided to produce an output signal when an accelerator pedal 54 of the vehicle is depressed, and an accelerator pedal position switch 56 is provided to produce an output signal when the accelerator pedal is depressed over a predetermined degree. The accelerator pedal switch 55 and accelerator pedal position switch 56 may be substituted for a throttle valve switch and throttle position switch, respectively. A choke switch 57 produces an output signal when a choke value of the engine is closed, and an air conditioner switch 58 produces an output signal at the operation of an air conditioner. An ignition pulse generator 60 produces pulses dependent on ignition pulses from an ignition coil 59, representing engine speed. A vehicle speed signal generator 62 produces pulses dependent on an output from a speedometer 61. These output signals and pulses are applied to a control unit 63 which controls the clutch current in dependency on the input signals.

Figure 3A:
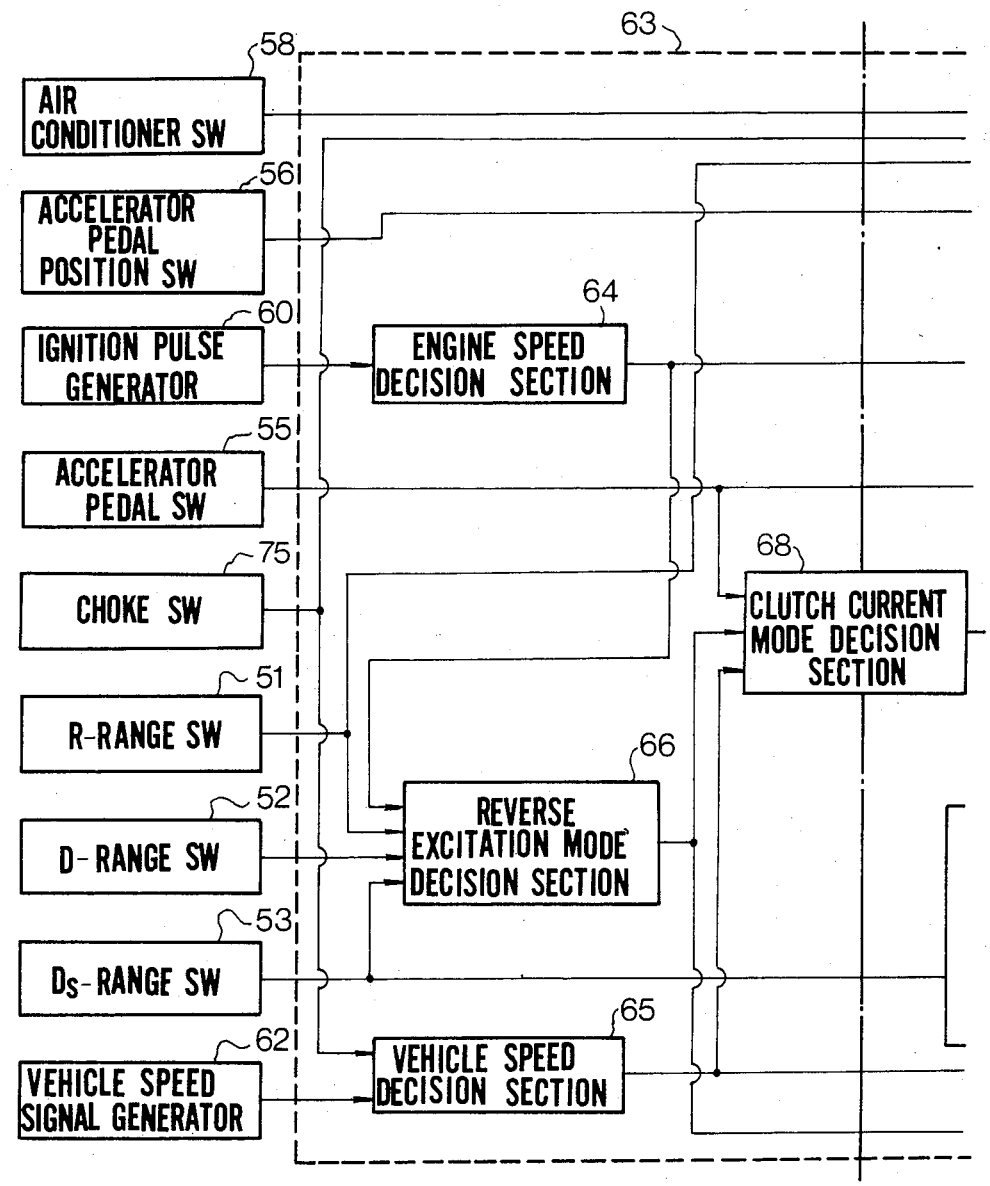
FIG. 3a, 3b together are a block diagram of a control unit according to the present invention.
Figure 3B:
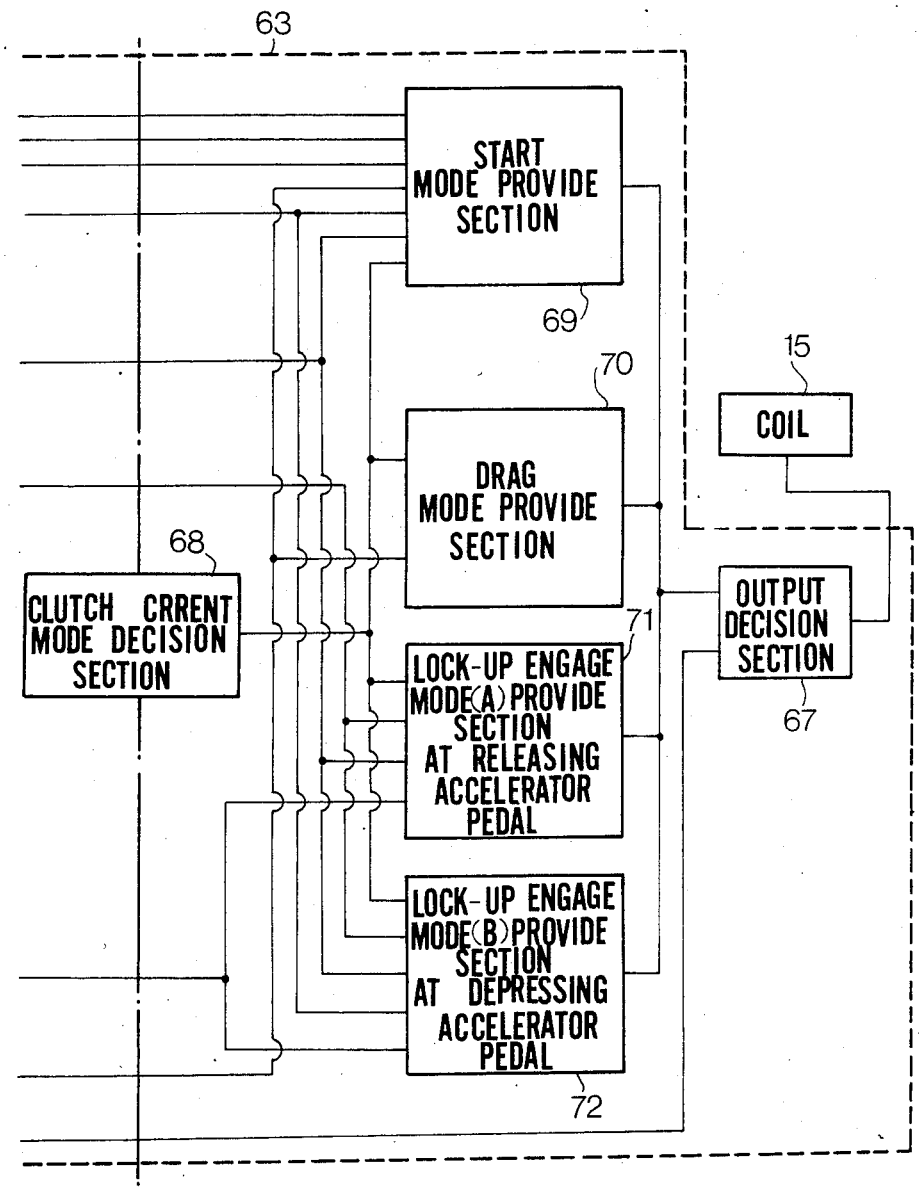

Referring to FIG. 3a, 3b the control unit 63 is provided with an engine speed decision section 64 applied with the ignition pulses from the generator 60, and a vehicle speed decision section 65 applied with the pulses from the generator 62. A reverse excitation mode decision section 66 decides that when output signals from the R-range switch 51, D-range switch 52 and Ds-range switch 53 are at low levels, the transmission is at P-range or N-range, and section 66 produces one of driving range select signals which means a reverse excitation signal. The reverse excitation signal is applied to an output decision section 67, so that a small reverse current flows in the coil 15 to excite the coil in reverse. When engine speed is below 300 rpm, an engine speed decision section 64 produces a low engine speed signal which is applied to the reverse excitation mode decision section 66 to excite the coil 15 in reverse. The output signals of the accelerator pedal depression switch 55 and the vehicle speed decision section 65, and the drive range select signals from the reverse excitation mode decision section 66 are applied to a clutch current mode decision section 68, outputs of which are applied to a start mode provide section 69, drag mode provide section 70, clutch lock-up engage mode (A) provide section 71 upon leasing the accelerator pedal, and clutch lock-up engage mode (B) provide section 72 upon depressing the accelerator pedal.

The start mode provide section 69 determines clutch current dependent on the engine speed represented by the output from the engine speed decision section 64. When the choke switch 57 or air conditioner switch 58 is turned on, clutch current having a high stall speed is selected Further, when choke switch 57 is ON, the characteristic of the clutch current is determined dependent on the output signals of the accelerator pedal position switch 56 and vehicle speed decision section 65. When the accelerator pedal is released, the drag mode provide section 70 selects a small drag current dependent on an output representing low vehicle speed from the vehicle speed decision section 65 and on the output of the clutch current mode decision section 68 at the release of the accelerator pedal. When the vehicle speed decreases below a predetermined low speed, the clutch current becomes zero to disengage the clutch. The clutch lock-up engage mode (A) provide section 71 selects a small lock-up current in response to the output of the accelerator pedal switch 55 at the release thereof at middle and high vehicle speed. When the Ds-range switch 53 is ON, the clutch current is cut off at a lower vehicle speed than the D-range. The clutch lock-up engage mode (B) provide section 72 selects a large lock-up current in response to the output of the accelerator pedal switch at depression of the accelerator pedal at middle and high vehicle speed. Clutch current at the Ds-range is the same as the mode (A). Outputs of sections 69 to 72 are applied to the output decision section 67 to control the clutch current.

Figure 5:
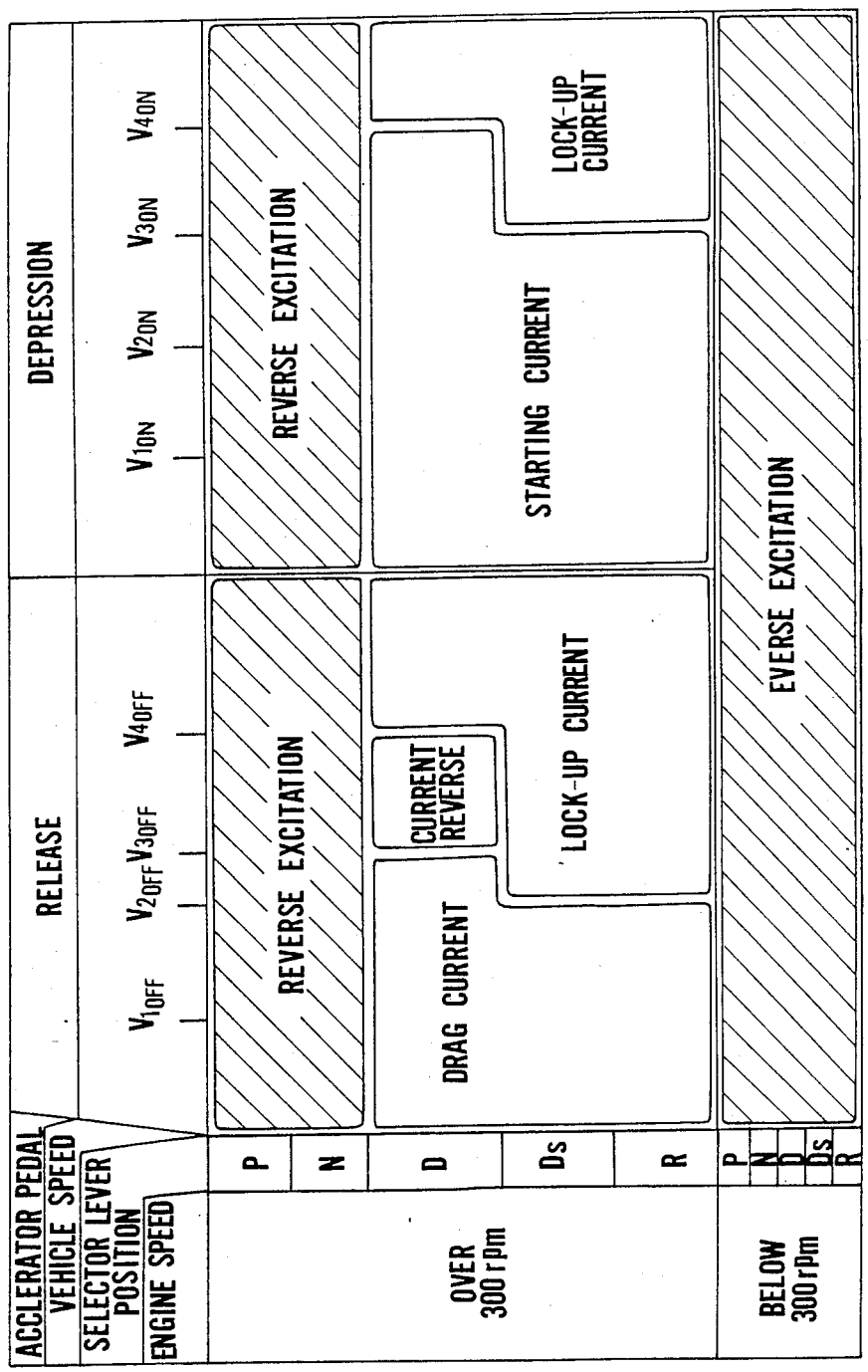
FIG. 5 is a graph showing regions of various modes.

Describing the operation of the control with reference to FIGS. 4 and 5, at a deciding point 80 (FIG. 4), it is determined whether the vehicle is at the reverse excitation mode. If the reverse excitation mode is detected, reverse clutch current flows in the coil 15. When engine speed is at a very low speed, for example below 300 rpm, the reverse clutch current flows at all ranges (FIG. 5). At a deciding point 81, clutch current supply mode is determined. If the accelerator pedal is released at a low vehicle speed, the clutch current is cut off or a small drag current flows. If the accelerator pedal is depressed, clutch current for starting the vehicle flows. At middle or high vehicle speed, when the accelerator pedal is released, a small lock-up current (mode A) flows, and at the depression of the pedal, a large lock-up current (mode B) flows.

Referring to FIGS. 6 and 7, at the N-range or P-range, a reverse current a flows in the coil. At the D-range, if the accelerator pedal is not depressed, a small drag current b flows to produce a small drag torque, thereby reducing the amount of play between the gears and decreasing the static friction torque in the belt and pulley device. When the accelerator pedal is depressed, a clutch current $c_1$ flows in proportion to engine speed. Clutch current $c_2$ flows under the operation of the air conditioner, and clutch current $c_3$ is for the operation when the choke valve is closed. When vehicle speed reaches a predetermined speed ($V_3$ or $V_4$ in FIG. 5), a large lock-up current d for entirely engaging the clutch flows to lock up the clutch. When the accelerator pedal is released to decelerate the vehicle, a small lock-up current e (FIG. 7) flows, so that electric power consumption is reduced. When the vehicle speed decreases below a predetermined value ($V_4$ in FIG. 5), the clutch current becomes zero f. When the vehicle speed further decreases below a predetermined value ($V_3$ or $V_2$), the small drag current b flows. When the vehicle is decelerated at the Ds-range or R-range, the small drag current b flows at a lower vehicle speed than the D-range as shown by reference e' in FIG. 7. Thus, sufficient engine braking effect is provided in a lower vehicle speed range.

From the foregoing, it will be understood that the present invention provides a system for properly controlling the clutch torque in accordance with driving conditions of the vehicle.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. A system for controlling an electromagnetic clutch for a motor vehicle having an infinitely variable belt-drive transmission which has a drive range, a reverse range and a neutral range, and a selector lever for selecting the ranges, the system comprising:
   vehicle speed detecting means for producing a vehicle speed signal;
   first switch means for detecting the position of the selector lever and for producing output signals depending on the reverse range, drive range a neutral range;
   second switch means for producing output signals dependent on depression and release of an accelerator pedal of the vehicle;
   first means for producing a reverse clutch current signal dependent on a signal of the first switch means indicative of a neutral position of the selector lever;
   second means for producing a vehicle start clutch current signal dependent on the signal from the second switch means at the depression of the accelerator pedal and on a signal from the vehicle speed detecting means at a low vehicle speed;
   third means for producing a small drag current signal dependent on the signal at low vehicle speed and on the signal from the second switch means at the release of the accelerator pedal;
   fourth means for producing a lock-up engage current signal dependent on the signal at middle and high vehicle speed; and
   output decision means applied with each of the current signals for controlling the current passing through a coil in the electromagnetic clutch in dependency on the applied current signal.

2. The system for controlling an electromagnetic clutch according to claim 1 further comprising engine speed detecting means for producing an output signal dependent on engine speed, the second means further responsive to the signal of the engine speed detecting means so as to increase the clutch current with increase of the engine speed.

3. The system for controlling an electromagnetic clutch according to claim 1 wherein the fourth means produces two kinds of lock-up engage current signals, one of which provides a small lock-up engage current at the release of the accelerator pedal, and the other provides a large lock-up engage current at the depression of the accelerator pedal.

4. The system according to claim 1, wherein
   said first means further produces said reverse clutch current signal when engine speed is lower than a predetermined low speed.

* * * * *